US009406241B2

(12) United States Patent
Cosgrove (10) Patent No.: US 9,406,241 B2
(45) Date of Patent: Aug. 2, 2016

(54) APPARATUS AND METHOD OF TEACHING MUSICAL NOTATION

(71) Applicant: Peter Declan Cosgrove, Rochdale (GB)

(72) Inventor: Peter Declan Cosgrove, Rochdale (GB)

(*) Notice: Subject to any disclaimer, the term of this patent is extended or adjusted under 35 U.S.C. 154(b) by 485 days.

(21) Appl. No.: 13/859,844

(22) Filed: Apr. 10, 2013

(65) Prior Publication Data

US 2014/0305284 A1 Oct. 16, 2014

(51) Int. Cl.
*G09B 15/00* (2006.01)
*G09B 15/02* (2006.01)

(52) U.S. Cl.
CPC ............ *G09B 15/001* (2013.01); *G09B 15/023* (2013.01); *G09B 15/026* (2013.01)

(58) Field of Classification Search
CPC ........ G09B 15/00; G09B 15/02; G09B 15/08; G09B 15/026; G09B 15/003; G09B 15/001; G09B 11/04; G09B 15/006; G09B 15/008; G10H 1/0016; G10H 2220/015; G10H 1/38; G10H 1/383; G10H 1/386; G10H 2210/056
USPC ..................... 84/470 R, 478, 477 R
See application file for complete search history.

(56) References Cited

U.S. PATENT DOCUMENTS

| 7,897,862 B2* | 3/2011 | Tashima | G09B 15/026 84/312 R |
| 2005/0014110 A1* | 1/2005 | Smith Carter | G09B 15/02 434/178 |
| 2006/0137512 A1 | 6/2006 | Lassar | |

FOREIGN PATENT DOCUMENTS

| CA | 2614028 A1 | 6/2008 |
| GB | 190306403 B | 4/1904 |
| WO | 0209087 A1 | 1/2002 |

* cited by examiner

*Primary Examiner* — Kimberly Lockett
(74) *Attorney, Agent, or Firm* — Mollborn Patents, Inc.; Fredrik Mollborn (57) ABSTRACT

An apparatus is provided which employs a system of musical notation which represents musical notes in a form of numbers, 1 to 7. The note numbers are defined to be mutually relative and are independent of any particular musical pitch or musical key. Optionally, a plurality of colors is used to identify specific chord and note numbers. Optionally, musical chord patterns are identified by numbers. Optionally, musical chord patterns are identified by colors. Optionally, key numbers are shown beneath corresponding lyric text, to provide an indication of rhythm pertaining to a musical piece defined in the system of musical notation. Optionally, note numbers are arranged on at least one horizontal line when presented for musical performance. The apparatus, and method employed in association therewith, are capable of expediting students when learning to play an instrument controlled via a keyboard, thereby improving student musical enjoyment and improvement in musical performance skill.

8 Claims, 8 Drawing Sheets

|   | lujah | Hallelujah | Halle |
|---|-------|------------|-------|
| R | 6 6   | 6  5 3 3   | 3 5   |
| R | 4     | 1          |       |
| R | 1     | 6          |       |
| L | 4     | 6          |       |

|   | lujah | Hallelu –u –u -u ujah |
|---|-------|------------------------|
| R | 6 6   | 6 5 $\overline{3}$  $\overline{4}$  $\overline{3}$  $\overline{2}$  $\overline{1}$ $\overline{1}$ |
| R | 4     | 1            7         |
| R | 1     | 5            5         |
| L | 4     | 1        5  1          |

APPARATUS AND METHOD OF TEACHING MUSICAL NOTATION

TECHNICAL FIELD

The present disclosure relates to apparatus for teaching musical notation, for example an apparatus for teaching musical notation for musical instruments including a keyboard, for example, a piano, an organ, a keyboard instrument, a synthesizer or similar. Moreover, the present disclosure also concerns methods of teaching musical notation, for example using aforesaid apparatus. Furthermore, the present disclosure relates to software products recorded on machine-readable data storage media, wherein the software products are executable upon computing hardware for implementing aforesaid methods.

BACKGROUND OF THE INVENTION

When learning to play a musical keyboard instrument, for example a piano, organ, synthesizer or similar, conventional tuition techniques require a student to learn a traditional musical notation system, wherein one or more dots disposed on a five-line staff are employed to represent notes. Such conventional tuition techniques can often take any months to master, because there is necessitated learning of an abstract form of notation, namely utilizing filled or unfilled circles on a staff, quarter notes, half notes, eighth notes, etc., wherein each note has to be translated via a player's mind into one or more actions to depress corresponding keys on a keyboard of a musical instrument; only after the student has begun to master the abstract form of notation, can significant enjoyment be derived from playing the musical instrument. As a result, many children students find aforesaid tuition boring, and many adult students excuse themselves by alleging that they are too old to learn.

Known methods of teaching musical notation are based on notation that relates to a fixed pitch regime, known as "absolute pitch", on a keyboard. Moreover, the notation does not easily allow students to transpose songs to play in different keys of a chromatic musical scale. Such transposition is found to be essential if a musician playing upon a keyboard is to accompany one or more singers having different vocal ranges, for example accompanying a choir or group of singers at a party. Mastering such transposition necessitates the musician learning a variety of different musical keys and various sharps (-#) and flats (-b) of a chromatic musical scale; learning such sharps and flats potentially further complicates the learning process for students.

Known methods of teaching musical notation to students are based, as aforementioned, on a system of musical notation which relates to a fixed pitch, known as "absolute pitch", on the keyboard, wherein traditional notation specifies a particular "musical scale", which prevents the student from choosing a scale which most suits his/her needs. Novice students may prefer to play all songs in a single scale, for example a single scale based on a musical chromatic note C, which is often considered to be an easiest scale to play, because the scale of C uses, for harmonization in major mode, all white notes and no black keys of a keyboard, thus rendering it easier for students to learn the scale of C. If traditional notation for a particular song does not happen to be printed in the scale of C, then the student is forced to learn a totally new scale, which will involve learning a different pattern of white and black keys of a keyboard; such new scales may be unfamiliar to the students and makes it slower for them to learn songs. On a conventional keyboard, there are twelve different major scales, which force a student to learn, if not all, the twelve scales. Such learning represents a significant cognitive barrier to any student who simply wishes to learn to play songs in a quickest possible time.

Traditional known musical notation is often of a complex nature, which results in many performers not being able to memorize musical pieces, and often feel that they need a copy of the musical notation when playing, namely a musical score, to enable them to perform, thus denying the performer with an opportunity of impromptu performances and "sing-alongs", where various members of an audience sing along with the music being played, namely a situation which often pertains at parties and other similar social gatherings.

A fundamental building block of contemporary songs is "chords" which are predefined patterns of three of more mutually different notes used in the aforesaid traditional musical notation. Moreover, a major disadvantage of traditional musical notation is that it is unable to represent chords, except by explicitly defining corresponding notes of the chords, which at least triples an amount of musical note representation that the student has to read, making it substantially slower to learn than a pattern-based notation method. In addition, it is found that a majority of popular music comprises a maximum of six mutually different chords, and many popular songs only use four mutually different chords per song, for example configured and repeated in various ways to support a tune, namely melody. As traditional musical notation is unable to represent chords, other than explicitly defining notes constituting the chords, it is highly desirable to transcode a large quantity of individual notes into a handful of simple recurring patterns to lessen mental processing strain on the student when performing musical pieces.

Traditional musical notation requires that all notes that are to be played are explicitly defined in the notation, meaning that a particular piece of notation has a fixed minimum level of musical skill required for its rendition. Thus, if the notation is aimed at a moderately skilled player, a learner student is likely to struggle with the notation and a proficient player is likely to be dissatisfied with the simplicity of the notation. Presently, a student who has learnt a song as a novice, and then wants to play the same song at a more proficient level, is obliged to buy a different musical arrangement of the song, namely to purchase a more advance musical notation for the song.

In a published Patent Cooperation Treaty (PCT) patent application no. WO 02/09087A1 (PCT/GB01/03352; applicant—Renham; "Musical Instrument and Musical Notation therefore"), there is described a standard musical instrument, such as a piano, which has a keyboard including a plurality of keys which can be depressed by a player when playing a piece of music upon the keyboard. The keyboard has accidental notes which are colored such that a same note on each octave of the keyboard is of a mutually similar color, for example a C-sharp key (C-# key), namely D-flat key (D-b key), is mutually similar color for all octaves of the keyboard. Such a musical instrument can be played in conjunction with a standard musical notation in which all the accidental notes are colored in the notation so as to correspond with the equivalent keys of the keyboard of the musical instrument.

SUMMARY

The various embodiments of the present invention seek to provide an improved apparatus for assisting students when learning to play a keyboard musical instrument.

The various embodiments of present invention also seek to provide an improved method of musical tuition, which is capable of enabling student to learn to play a keyboard musical instrument more rapidly.

According to a first aspect, there is provided an apparatus employing a system of musical notation that represents musical notes in a form of numbers, 1 to 7.

The present invention is of advantage in that numerical representation of musical notation is more rapidly appreciated and interpreted by students in comparison to known contemporary forms of musical notation.

Optionally, in the apparatus employing the system of musical notation, the note numbers are defined to be mutually relative and are independent of any particular musical pitch or musical key.

Optionally, in the apparatus employing the system of musical notation, a plurality of colors is used to identify specific chord and note numbers.

Optionally, in the apparatus employing the system of musical notation, musical chord patterns are identified by numbers.

Optionally, in the apparatus employing the system of musical notation, musical chord patterns are identified by colors.

Optionally, in the apparatus employing the system of musical notation, key numbers are shown beneath corresponding lyric text, to provide an indication of rhythm pertaining to a musical piece defined in the system of musical notation.

Optionally, in the apparatus employing the system of musical notation, note numbers are arranged on at least one horizontal line when presented for musical performance.

Optionally, in the apparatus employing the system of musical notation, different horizontal lines are used to differentiate between each note played simultaneously, wherein the notes correspond to a melody, and wherein different notes comprise a chord and a bass.

Optionally, in the apparatus employing the system of musical notation, notation marks indicate the relative octave of the note compared to a corresponding starting point.

Optionally, in the apparatus employing the system of musical notation, notation marks indicate where a note is to be played which is a semitone higher or lower than a note in a standard seven-note musical scale.

According to a second aspect, there is provided a tuition method for a musical instrument whose sounds are controlled via a keyboard, wherein the method includes relating note numbers to specific keys on the keyboard, which vary depending on the musical 'scale' or 'key' selected.

Optionally, the method includes using at least one diagram to denote different keys on the keyboard which relate to each note number in a specific musical key.

Optionally, the method includes repeating key numbers 1 to 7 across a length of the keyboard.

Optionally, the method includes pacing at least one octave of key numbers from 1 to 7 on the keyboard keys by use of overlays, stickers or transfers.

Optionally, the method includes attaching at least one octave of key numbers from 1 to 7 to the keyboard by using a rigid or flexible physical strip, made from plastics material, metal, wood, paper, cardboard, polymers, fabrics or any combination of these materials.

Optionally, the method includes using a numerical formula to create at least one standard chord type which are playable in any key in a musical scale.

Optionally, the method includes using a single hand position for at least one chord type which is useable to play any chord number by maintaining a given same hand shape and moving a corresponding hand to a different position on the keyboard. More optionally, the method includes using a numerical formula to create a standard hand shape for each chord inversion.

Optionally, the method includes using a numerical formula for enabling an appropriate chord to be formed from a bass note, allowing chord accompaniment to be played to an entire song based solely on one or more bass key numbers, irrespective of the scale or musical key being used.

Optionally, the method includes utilizing one or more diagrams to show key numbers and hand positions for Standard chords and one or more chord inversions Optionally, the method includes applying numerical patterns to every bass note on a given song sheet, for enabling a three-note bass sequence to be played from each single bass key note.

According to a third aspect, there is provided a method of playing a piano, organ or keyboard instrument, wherein the method includes reading and interpreting the system of musical notation as employed in the apparatus according to the first aspect, and applying tuition techniques to translate the notation into appropriate keys to be played according to the method of the second aspect.

According to a fourth aspect, there is provided a software product recorded on machine-readable data storage media, characterized in that the software product is executable upon computing hardware for executing a method pursuant to the second aspect and/or third aspect.

It will be appreciated that features of the invention are susceptible to being combined in various combinations without departing from the scope of the invention as defined by the appended claims.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

In overview, the present invention is concerned with an apparatus for teaching musical notation. The apparatus is employed to execute a method of musical notation, known as "DecPlay", which replaces known conventional musical notation with a new numbers and color notation, based upon "relative pitch" rather than "absolute pitch". The DecPlay notation identifies and visually conveys musical chordal patterns, which exist in popular music, in addition to a melody, wherein the DecPlay notation enables novice students, as well as advanced players, to play different musical arrangements, from a same piece of sheet music utilizing DecPlay notation. The DecPlay notation is able to connect "relative" pitch notation to specific keys of a keyboard of the apparatus, depending upon a musical scale required to enable transposition of the relative pitch, to any musical scale selected. Conveniently, the apparatus is implemented as a key-not-to-number and chord converter device, to convert "absolute pitch" music to "relative pitch" DecPlay notation music. Moreover, the apparatus is beneficially implemented using computing hardware which operable to execute one or more software products recorded on machine-readable data storage media.

The aforesaid DecPlay musical notation employs a system of numbers, patterns and colors. Moreover, the DecPlay notation can be learnt by novice students within minutes of study, in contradistinction to months required to master known traditional musical notation systems. Unlike known traditional "abstract" musical notation systems, the DecPlay notation uses numbers, patterns and colors with which a vast majority of students are already familiar. On account of the DecPlay notation only employing seven numbers and seven colors, it dramatically improves tuition success with all students, for example it is easy for children and senior citizens to learn, as well as students with special needs, for example handicapped students.

The aforesaid DecPlay notation is capable of dispensing with a need to teach rhythm notation, because the DecPlay notation is easily capable of conveying rhythm by harnessing a student's existing knowledge of a given rhythm of a song's lyric; in a case of instrumental music, the DecPlay notation utilizes an existing knowledge of the student regarding how a melody should sound. For example, a piece of music expressed in DecPlay notation is also provided with an MP3 recording of the piece of music, so that the student can learn the rhythm by listening to the MP3 recording prior to attempting to play the piece of music on a keyboard.

Unlike known traditional notation, the DecPlay notation is based on "relative pitch", rather than "absolute pitch". Thus, the DecPlay notation enables a performer, for example the aforesaid student, to transpose substantially instantly a piece of music to suit a singing range of a singer. The same pattern of numbers and colors employed in the DecPlay notation, for example learnt from a song sheet, enables the performer to play in any musical scale. As the performer can select which musical scale he/she wishes to employ, instead of the music notation dictating a scale as conventionally occurs, the performer employing the DecPlay notation only needs to learn one musical scale if they are performing without needing to provide vocalist accompaniment. In a situation where vocalist accompaniment is required, the DecPlay notation only requires the performer to learn two musical scales, namely "Standard scale" and "Alternative scale", as these two scales are capable of providing sufficient flexibility of range for a majority of vocalist requirements. Beneficially, the Standard scale only uses white keys of a keyboard, and the Alternative scale only uses one black key of the keyboard per octave, so that complexities of learning various sharps and flats keys of the keyboard are avoided.

When implementing a method employing the DecPlay notation, there are two distinct stages: Stage 1, Stage 2. In Stage 1, musical patterns are identified and visually conveyed, which exist in all popular music, thus enabling performances to be easily learnt and memorized, for example by students: for example, most songs are based around chords 1, 4 and 5, with only occasional use of chords 2, 3, 6 and 7, as will be elucidated in greater detail later.

In the DecPlay notation, patterns are replicated in hand shapes, namely "standard chords", when playing on a keyboard, thereby addressing complexities of learning songs by traditional musical notation which often takes months to master, and this enabling learning of musical pieces potentially in just minutes. On account of the patterns being based on "relative pitch", the performer can use a same hand position to transpose a musical scale employed at ease, simply by moving the performer's hand up or down the keyboard. Beneficially, these same patterns are very useful in helping performers "play by ear", namely from memory, without needing to view the DecPlay notation.

The DecPlay notation employs very simple rules which optionally use only three members, namely "spread out chords", "bass doubling" and "151 base", for enabling professional styles of musical performance to be achieved. Moreover, the DecPlay notation employs two principal lines which are suitable for novices, namely a melody line and a chord line, together with other subsidiary lines which advanced players can use instead of the chord line, thereby enabling a single song sheet expressed in DecPlay notation to suit a range of musical proficiency.

In Stage 1 of the method employing the DecPlay notation, the method enables performers to play accompaniments to songs with ease. An extract from a song sheet that replaces traditional known musical notation is shown. The extract includes a lyric line, which includes a lyric to a song, and a chord line, which denotes both bass notes to be employed, and a corresponding "Standard chord" in a simultaneous manner. When using the DecPlay notation, the performer follows the rhythm of the lyric from left to right across the notation, and plays the "chord number" and "key notes" temporally simultaneously as the lyric included directly vertical thereabove.

Figure 3:
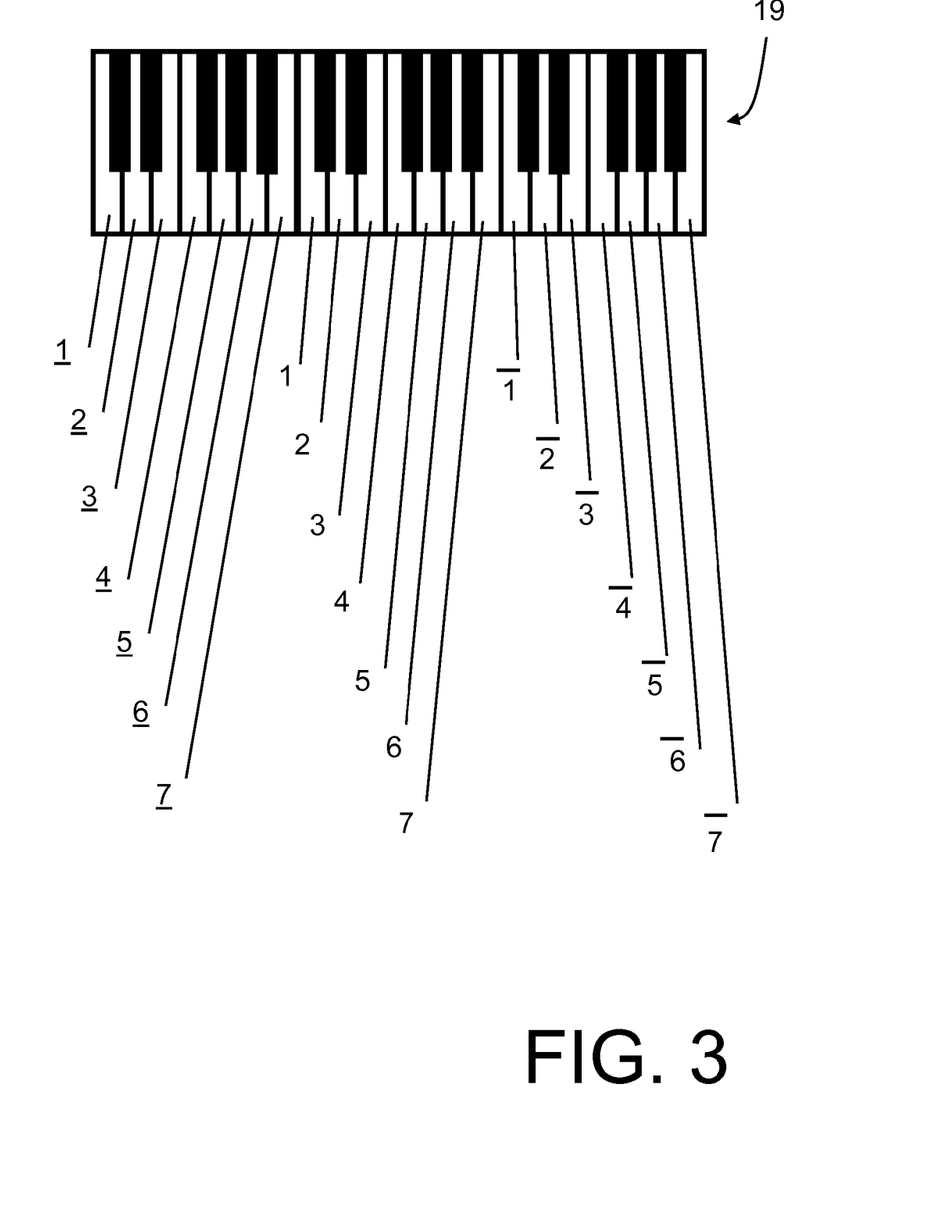
FIG. 3 is an illustration of a relation of note number to keys of a keyboard in a "Standard scale" employed for the DecPlay notation; a line above or below the note numbers is employed to indicate in which octave an indicated note is to be played on the keyboard.

In FIG. 3, there is illustrated a keyboard indicated generally by 19. The keyboard 19 is shown with numbers relating to each key thereof, in numerical value from one to seven. These numbers are then repeated across an extent of the keyboard 19 with the same seven notes being playable in higher octaves, a further to the right-hand-side of the keyboard 19. Each key number of the same numerical value denotes the same musical note in its respective octave. In a preferred embodiment, the keys of the keyboard 19 are marked according to the aforesaid key numbers by employing stickers or a marker strip board, which spans an octave or more, which rests upon the keys, or is attached to the keyboard and presents to a player of the keyboard 19 the key numbers of each key.

Figure 1A:
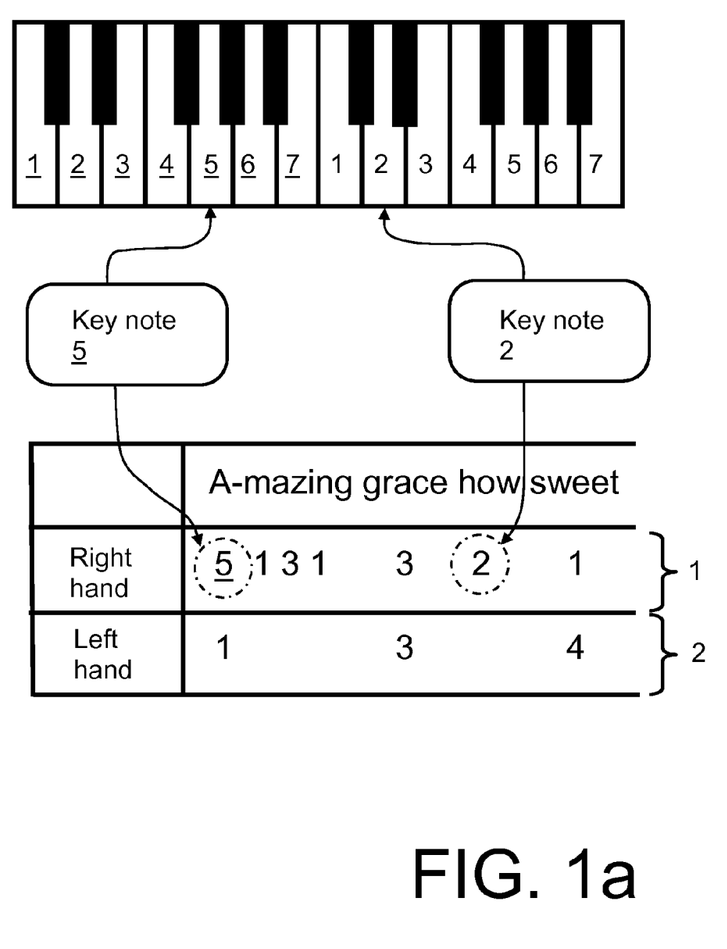
FIG. 1a is an illustration of an extract from a "Stage 1" song sheet expressed in DecPlay notation, wherein the illustration depicts a lyric of a song with corresponding key numbers relating to a standard chord and bass parts; "DecPlay" is a trademark.
Figure 1B:
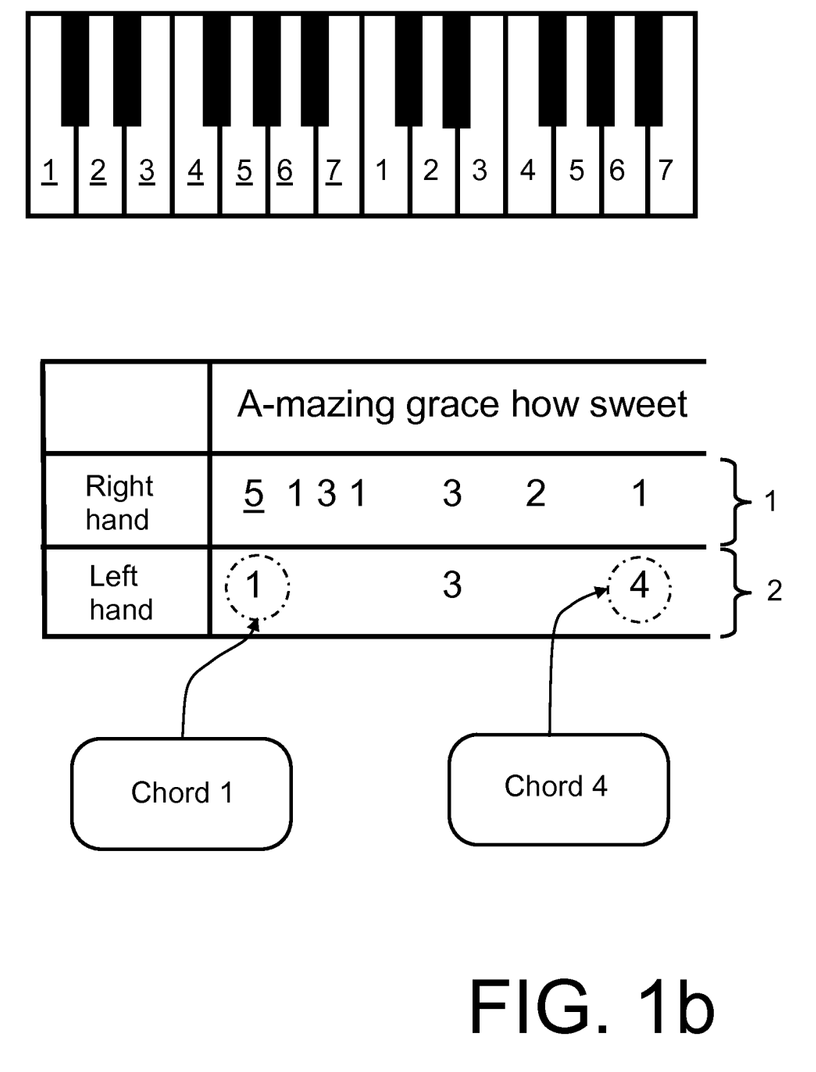
FIG. 1b is an illustration of an extract from a "Stage 1" song sheet in DecPlay notation, wherein the illustration depicts chord numbers; in an event that a left-hand part includes numbers in black color, these are key note numbers, not chord numbers, because all chords are shown in colors other than black; such black numbers are employed when a player's left hand is playing a riff or tune, in between the chords, for example as included in a song "Imagine" by John Lennon.
Figure 4:
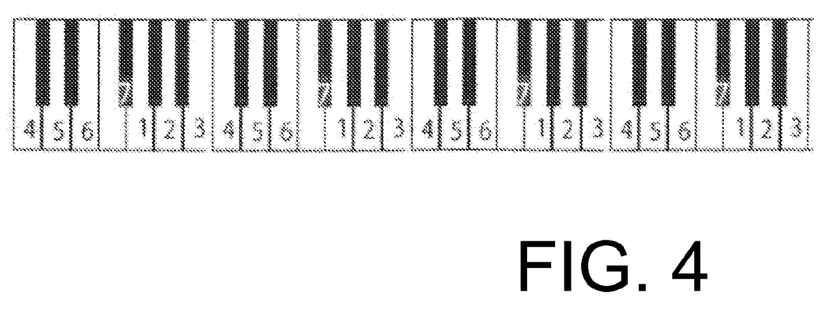
FIG. 4 is an illustration showing how note numbers employed in the DecPlay notation relate to keys on a keyboard in an "Alternative scale" employed in the DecPlay notation.
Figure 5B:
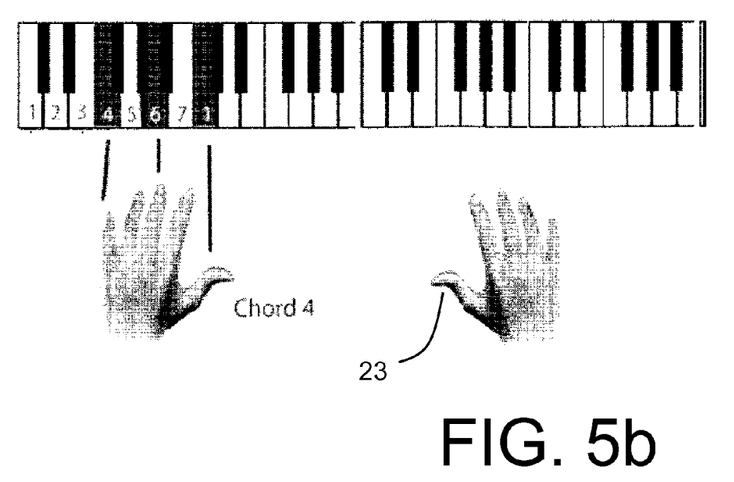
FIG. 5b is an illustration of keys to press on a keyboard in order to play a Standard chord 4 in a performer's left hand.
Figure 6:
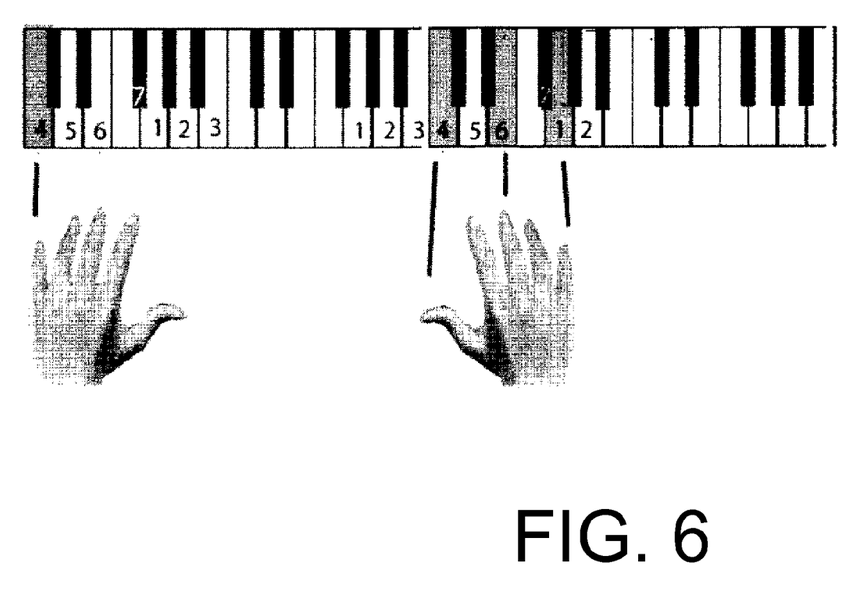
FIG. 6 is an illustration of keys to press on a keyboard in order to play a Standard chord 4 in a performer's right hand, and a bass note 4 in the performer's left hand, in an Alternative scale of the DecPlay notation.

The key numbers denote a relative pitch of notes in a musical scale; in FIG. 3, the numbers shown pertain to a "Standard scale", namely C-major, which uses only white notes of the keyboard 19. As the key numbers denote relative pitch, they can be used to play in any musical "key" as illustrated in FIG. 4 where an "Alternative scale" is used, namely G-major which employs all white leys, except for a F-# corresponding to key number 7. To change key, when playing a piece of music using DecPlay notation, the player simply selects a different key on the keyboard 19 to use as key number 1, and starts relative numbering from this key number 1. For example, key number 5 in FIG. 1 becomes key number 1 in FIG. 4. Moreover, standard chord 4 in the Standard scale is shown in FIG. 5b and Standard chord 4 in the Alternative scale is shown in FIG. 6. When using various alternative keys, appropriate black notes of the keyboard 19 need to be employed to conform to a major scale. Such use of black notes is illustrated in FIG. 4 where key number 7 is a black key, namely F-# (F-sharp).

Figure 5A:
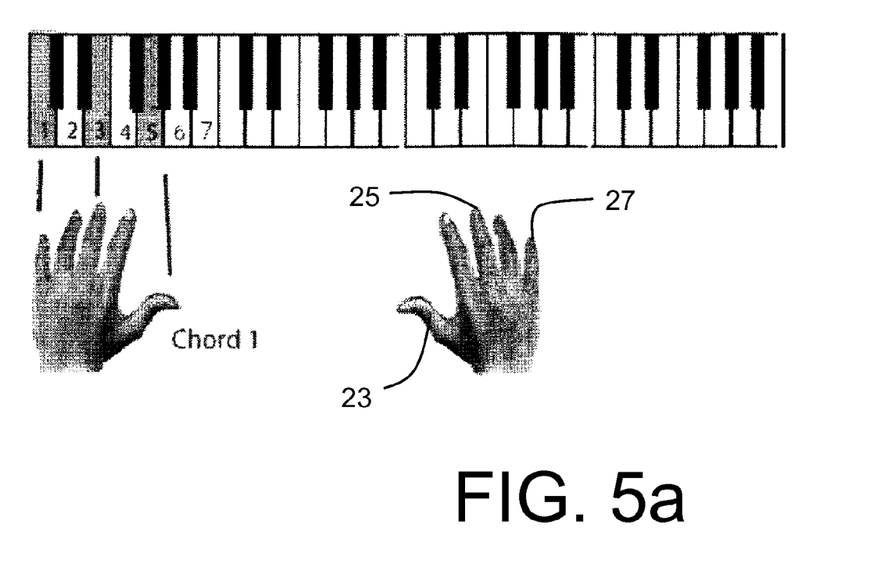
FIG. 5a is an illustration of which keys on a keyboard to press in order to play a Standard chord 1 in a performer's left hand.

In FIG. 5a, there is shown a "Standard chord shape" which enables students, for example students, to learn a simple hand position by using a sequence of numbers in the aforesaid DecPlay notation; such an approach enables the students to play all chords easily, simply by moving their right hand up and down the keyboard 19. The "Standard chord shape", for a right hand, is found by placing a thumb 23 of the right hand on key number 1, a middle finger 25 on key number 3, and a little finger 27 on key number 5. A corresponding left hand beneficially plays the same note number as the right hand thumb 23, but two octaves lower down on the keyboard 19.

Figure 5C:
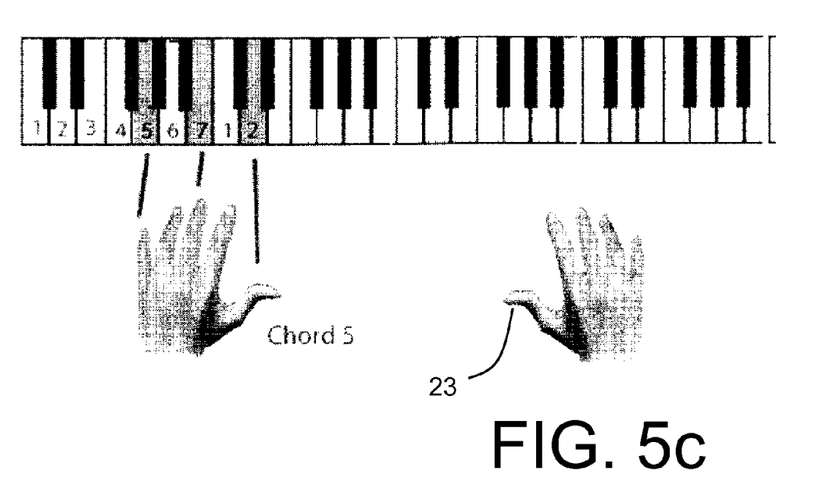
FIG. 5c is an illustration of keys to press on a keyboard in order to play a Standard chord 5 in a performer's left hand.

If the student keeps his/her right hand in the correct "Standard chord shape" on the keyboard 19, it is possible to play all seven of these chords, simply by the student moving her/her right-hand thumb position up to an appropriate key number "key number" from 1 to 7; for example, for chord 1, the thumb 23 is placed on key number 1, and corresponds notes for chord 1 simultaneously and creates "chord 1" and a bass note 1 as illustrated in FIG. 5a. As another example, to play chord 4, the student maintains a similar right-hand shape and moves his/her right thumb 23 to key number 4, as illustrated in FIG. 5b. As a further example, to play chord 5, the student maintains a similar right-hand shape and moves his/her right thumb 23 to key number 5, as illustrated in FIG. 5c.

Chord 1 can be first inverted which represents a variation of the aforesaid "Standard chord shape", wherein the student's right hand is changed from playing, in an ascending pitch, key numbers 1, 3 and 5, to playing 3, 5 and 1 respectively, with key number 1 being at an octave higher than the key number 5. Moreover, chord 1 can be second inverted by playing key numbers 5, 1 and 3, with key numbers 1 and 3 being at an octave higher than the key number 5. The first and second inversion of chord 1 can add interest to the piece of music being played by the student to avoid a somewhat monotonous form of accompaniment.

Optionally, to make it easier for the student to identify patterns of chords on a song sheet presented in the DecPlay notation, the chords are color-coded, for example in a manner as provided in Table 1.

TABLE 1

Color coding employed for chords in the DecPlay notation

| Chord | Color employed to depict chord |
| --- | --- |
| Chord 1 | Green |
| Chord 2 | Turquoise |
| Chord 3 | Orange |
| Chord 4 | Blue |
| Chord 5 | Red |
| Chord 6 | Purple |
| Chord 7 | Grey |

Figure 2:
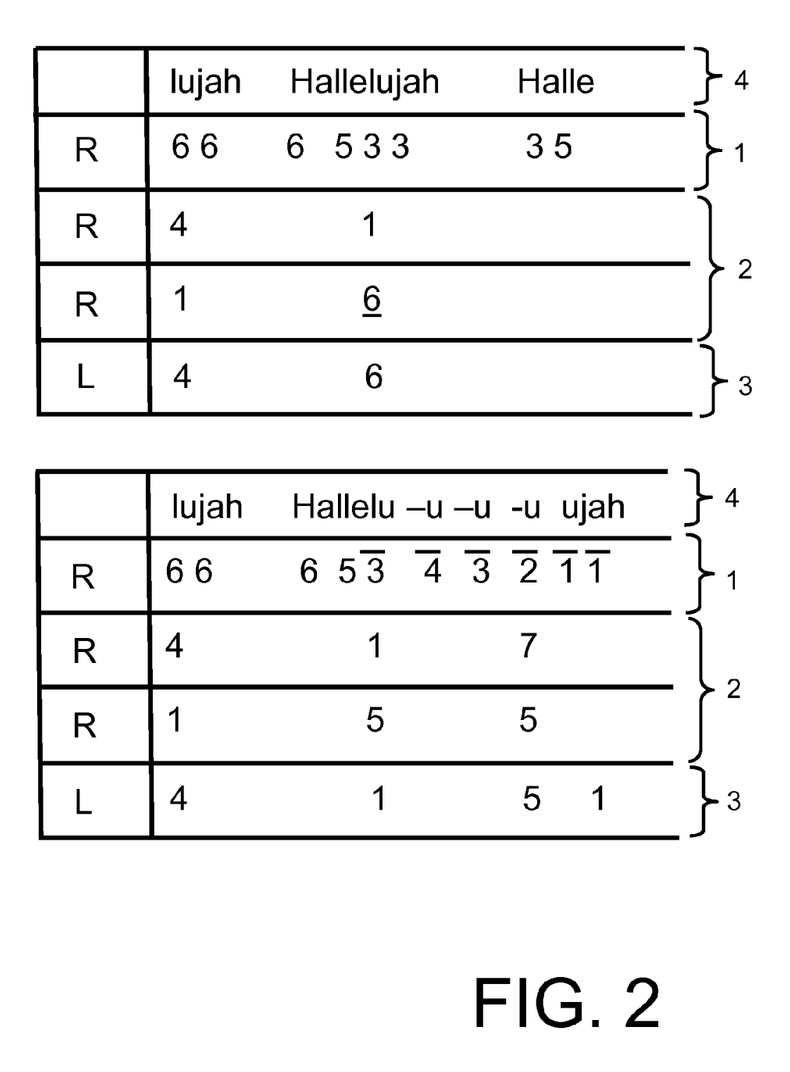
FIG. 2 is an illustration of an extract from a "Stage 2" song sheet in DecPlay notation, wherein a lyric of a song and corresponding key numbers are depicted to be played for a melody, wherein advanced chord and bass parts are included.

Referring again to FIG. 2, there is shown an extract from a Stage 2 of a song sheet, which enables performers to read individual note numbers to enable to play both the melody 1 and various inversion of chords 2 in his/her right hand, and an appropriate bass line 3 in his/her left hand. The bass line 3 is optionally shaded or otherwise differentiated from the right-hand lines denoted by 1, 2, to make it easier for the student to identify the left-hand part. Stage 2 song sheets enables performances of songs without a need for vocal accompaniment and provides a flexible extension beyond "Standard chords" to enable the student to play any variation of chords, because individual key numbers of notes within the chords are specified, instead of merely using the "Standard chord shape" to determine the notes, which can potentially sound somewhat monotonous. In FIG. 2, a left-hand column in the DecPlay notation is used to show which hands of the student play which line of key numbers, wherein a right hand is denoted by "R", and a left hand is denoted by "L".

When performing a piece of music, the student follows a rhythm of lyrics in a lyric line 4, reading from left to right, and the key numbers shown vertically underneath are played simultaneously by the student. The melody line 1 follows a key designation as illustrated in FIG. 3, wherein a line below a key number indicates that the key number to be depressed by the student is in a lower octave, whereas a line above the key number indicated to be depressed by the student is in a high octave.

In the DecPlay musical notation, there is not a need to specify which octave the key numbers in lines 2 are to be played, as they generally follow a rule of being a next specified available note below the melody line 1, and the bass line 3 is always generally one to two octaves below the key number in melody line 1. In order to maintain an integrity of the song in its originally conceived form, it is important that the melody line 1 follows a prescribed pattern, so rather than the student selecting a nearest key number specified, the song sheet expressed in DecPlay notation will outline whether the key number is in a higher octave or a lower octave, as illustrated in FIG. 3, as aforementioned. Prefix symbols are optionally employed to indicate where any of the notes are required to be played outside the "Standard scale"; a "−" sign before a note indicates a nearest black or white note to a left of the key number indicated should be depressed by the student, whereas a "+" sign before a note indicates a nearest black or white note to the left of key number 7, for example refer to Table 2 below. As aforesaid "−" symbols above or below a given key number indicate an associated octave to be used for playing the given note, relative to an octave in which the melody started.

TABLE 2

Melody designations employed in the DecPlay notation

| Notation for melody | Interpretation of the notation for melody |
|---|---|
| $\overline{1}$ | Key number 1 pressed in an octave higher than a starting point octave |
| 1 | Key number 1 pressed in a starting point octave |
| $\underline{1}$ | Key number 1 pressed in a octave lower than a starting octave |
| −7 | Nearest black or white note to a left side of key number 7 |
| +1 | Nearest black or white note to a right side of key number 7 |

Optionally, a double line above or below a given key number in the melody line 1 is used to indicate that the given note is to be played two octaves above or two octaves below the octave in which the melody started, respectively.

In contradistinction to known traditional methods of musical notation which prescribe a fixed sequence of notes in absolute pitch and with defined rhythm, the DecPlay notation described in the foregoing provides a "framework" together with several simple numerical patterns, which enable a performer, for example the aforesaid student, to play "ad lib", within a structured environment provided by the DecPlay notation. On account of the DecPlay notation being implemented for "relative pitch" and following patterns which are common to most contemporary Western music, techniques employed in respect of the DecPlay notation can be applied successfully to a large number of songs. For example, the student, when using the DecPlay notation, rather than playing chord note simultaneously, can play them in sequence to create a more professional sound, especially when slow songs are being performed. In a preferred embodiment of the DecPlay notation, a bass and right-hand thumb are played together, followed by the third finger, then the fifth finger, and thereafter the thumb of the right hand. In another preferred embodiment, a bass key number 1 is played first, thereafter followed by right-hand key number 1, thereafter key number 3, and finally thereafter key number 5. In yet another embodiment, in order to create a stronger sound, a "bass doubling" technique is employed, wherein a little finger of the student's left hand is employed to play a bass note on the keyboard 19, and a thumb of the left hand is employed to play a corresponding note at an octave higher on the keyboard 19.

In another preferred embodiment, in order to create a more professional bass sound, the DecPlay notation makes it possible to extend bass doubling, as aforementioned, to a "151 Bass fill" by adding an extra bass note in the left hand using a second thereof, to each bass key numbers on a given song sheet utilizing DecPlay notation. This extra bass note is always 5 notes up from the bass key number specified in the song sheet. Thus, for each bass key number specified, four notes are playing, namely by playing the left-hand little finger on a key of the keyboard 19 for a key number specified, then the left-hand second finger at a key number five notes up from the left-hand little finger, then the left-hand thumb at the key number specified at one octave higher on the keyboard 19, and then the left-hand little finger at the specified key number; for example, if the bass key number is 5, then the "151 Bass fill" is key numbers 5, 2, 5, in a higher octave, back to key number 5 in the original octave.

Figure 7:
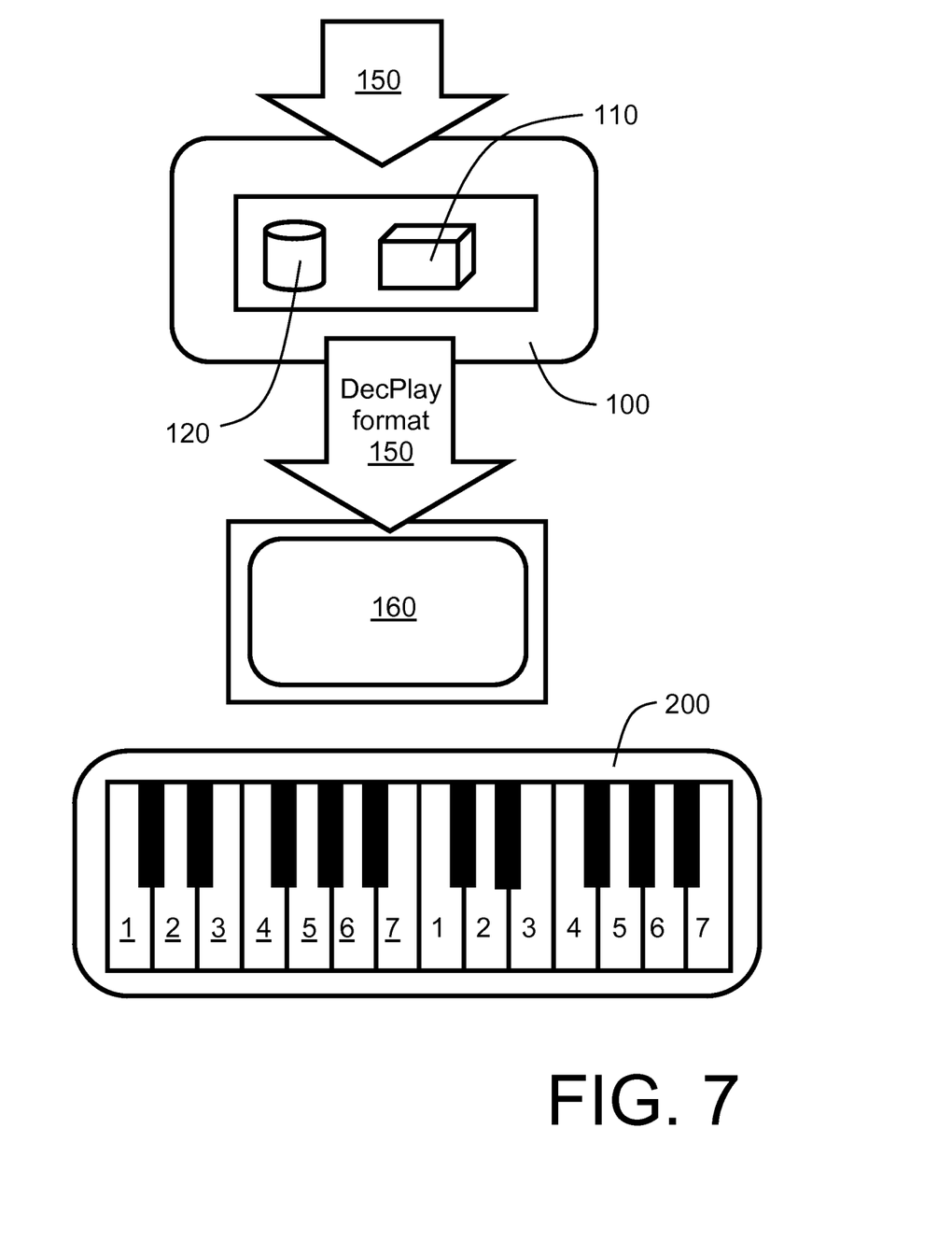
FIG. 7 is an illustration of apparatus pursuant to the present invention, wherein the apparatus is operable, in a similar manner to an encoder or decoder, to transform input data in a form of a MIDI file, an optical scan of traditional musical notation and similar, to generate transcoded output data in DecPlay notation, for interpretation by a performer when playing on a keyboard instrument.

Referring next to FIG. 7, it is generally appreciated that data encoders, data transcoders and data decoders and similar are susceptible to being patented in most patenting regimes around the World. Such data transformation results in a technical effect, for example data compression, data entropy reduction and so forth. In a similar manner, in FIG. 7, there is shown an apparatus 100 for transcoding input musical data, for example optically scanned traditional music notation, MIDI data or similar, supplied as data 150. The apparatus 100 includes a data processing arrangement 110, which is operable to execute one or more software products 120 recorded on machine-readable data storage media; alternatively, the apparatus 100 is implemented in application-specific digital hardware, for example as one or more ASIC's or similar. The apparatus 100 is operable to transcode the data 150 to generate corresponding data in DecPlay notation when presented on a screen 160, or when printed onto a physical information carrier such as card, paper, plastics material film or similar. A student is able to view the DecPlay notation, for example structured as described in the foregoing, and play a corresponding piece of music on a musical instrument 200, for example incorporating the aforesaid keyboard 19. In general, the DecPlay notation shown on the display 160 is reduced in data content in comparison to the data 150 and thus represents a form of technical data reduction in a very specific DecPlay manner as described in the foregoing. Optionally, the apparatus 100, together with its screen 160, is implemented using a tablet computer or a phablet computer, which can be disposed on a sheet music rest of the musical instrument 200, and the student plays directly from information presented on the screen 160 in DecPlay notation. The one or more software products 120 are then conveniently downloaded as one or more software applications, for example via a wireless communication network from a database, for example an "App store".

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. An apparatus employing a system of musical notation which represents musical notes in a form of numbers, 1 to 7,
   wherein a plurality of colors are used to identify specific chord and note numbers, and
   wherein different horizontal lines are used to differentiate between each note played simultaneously, wherein the notes correspond to a melody, and wherein different notes comprise a chord and a bass.

2. The apparatus employing the system of musical notation, as claimed in claim 1, wherein the note numbers are defined to be mutually relative and are independent of any particular musical pitch or musical key.

3. The apparatus employing the system of musical notation, as claimed in claim 1, wherein musical chord patterns are identified by numbers.

4. The apparatus employing the system of musical notation, as claimed in claim 1, wherein musical chord patterns are identified by colors.

5. The apparatus employing the system of musical notation, as claimed in claim 1, wherein key numbers are shown beneath corresponding lyric text, to provide an indication of rhythm pertaining to a musical piece defined in the system of musical notation.

6. The apparatus employing the system of musical notation, as claimed in claim 1, wherein note numbers are arranged on at least one horizontal line when presented for musical performance.

7. The apparatus employing the system of musical notation, as claimed in claim 1, wherein notation marks indicate the relative octave of the note compared to a corresponding starting point.

8. The apparatus employing the system of musical notation, as claimed in claim 1, wherein notation marks indicate where a note is to be played which is a semitone higher or lower than a note in a standard seven-note musical scale.

\* \* \* \* \*